United States Patent
Kurematsu (10) Patent No.: US 9,086,119 B2
(45) Date of Patent: Jul. 21, 2015

(54) HYDRAULIC TENSIONER

(71) Applicant: Tsubakimoto Chain Co., Osaka (JP)

(72) Inventor: Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 302 days.

(21) Appl. No.: 13/803,276

(22) Filed: Mar. 14, 2013

(65) Prior Publication Data

US 2013/0260930 A1 Oct. 3, 2013

(30) Foreign Application Priority Data

Mar. 28, 2012 (JP) .................................. 2012-074304

(51) Int. Cl.
*F16H 7/08* (2006.01)

(52) U.S. Cl.
CPC ................ *F16H 7/08* (2013.01); *F16H 7/0848* (2013.01); *F16H 2007/0806* (2013.01); *F16H 2007/0812* (2013.01); *F16H 2007/0859* (2013.01); *F16H 2007/0893* (2013.01)

(58) Field of Classification Search
CPC ................ F16H 2007/0806; F16H 2007/0812; F16H 2007/0848; F16H 2007/0859
USPC ........................................................ 474/110
See application file for complete search history.

(56) References Cited

U.S. PATENT DOCUMENTS

| 7,404,776 B2 * | 7/2008 | Yoshida ......................... 474/110 |
| 7,641,575 B2 * | 1/2010 | Yoshida ......................... 474/109 |
| 2006/0094549 A1 * | 5/2006 | Yoshida et al. ............... 474/110 |
| 2007/0249444 A1 * | 10/2007 | Yoshida et al. ............... 474/110 |
| 2010/0029424 A1 * | 2/2010 | Palomaki et al. ............. 474/110 |
| 2011/0263366 A1 * | 10/2011 | Botez ............................. 474/110 |

FOREIGN PATENT DOCUMENTS

JP 10030695 A 2/1998

* cited by examiner

*Primary Examiner* — William E Dondero
*Assistant Examiner* — Mark K Buse
(74) *Attorney, Agent, or Firm* — Howson & Howson LLP (57) ABSTRACT

In a hydraulic tensioner, a check valve comprises a check ball disposed within a seat/retainer combination in which a ball seat and retainer are formed as a unit and connected by a bend. The check valve is mounted so that it can rotate within the tensioner housing about a center line, and formed so that its center of gravity is offset from the center line. The check valve unit therefore tends to assume a position in which its center of gravity is directly below the center line. Openings that allow flow of oil from the interior of the check valve unit to a hydraulic chamber in the tensioner are positioned so that, when the center of gravity of the check valve unit is directly below the center line, the check ball cannot block or restrict flow through the openings.

4 Claims, 4 Drawing Sheets

HYDRAULIC TENSIONER

CROSS REFERENCE TO RELATED APPLICATIONS

The disclosure of Japanese Patent Application No. 2012-074304, filed on Mar. 28, 2012, and on which a claim for priority will be made, is incorporated by reference.

FIELD OF THE INVENTION

The invention relates to a hydraulic tensioner for applying tension to an endless flexible traveling transmission medium such as a timing chain in an automobile engine, and more specifically to the configuration of a check valve in a hydraulic tensioner.

BACKGROUND OF THE INVENTION

A hydraulic tensioner typically includes a check valve for allowing oil to flow under pressure through an oil supply passage into an oil chamber formed by a tensioner housing and a plunger protruding from the housing, and for restricting reverse flow of oil from the oil chamber to the oil supply passage.

The check valve is a unit that includes a ball seat having an oil passage, a check ball that opens and closes the oil passage by separating from and seating on a surface of the ball seat, and a retainer that forms a valve chamber accommodating the check ball and restricting the stroke of the check ball, i.e., the distance through which the check ball moves when it separates from the ball seat. A typical check valve unit is described in the Japanese Patent Application laid open on Feb. 3, 1998 under No. H10-30695.

When the retainer and the ball seat of the check valve unit are composed of different parts, it is necessary to hold the check ball between the retainer and the ball seat during assembly of the check valve unit. Consequently assembly and installation of the check valve unit are difficult, and the cost of the check valve unit and the overall cost of the tensioner are increased.

The attitude of the tensioner depends on the manner in which it is installed. Accordingly, the angle between the center line of the ball seat in the check valve of the tensioner and the vertical direction can vary. The check ball of course tends to move downward within the valve chamber due to gravity. If a hole in the retainer that connects the valve chamber with the oil chamber of the tensioner is located directly underneath the check ball, the check ball tends to become displaced downwardly when the check valve opens, and it becomes difficult to form an oil film between the check ball and the wall of the valve chamber. As a result, the flow of oil into the hydraulic chamber varies considerably due to retardation of the closure of the check ball against the valve seat, and the check ball tends to move in a disorderly manner. The result is an impairment of the performance of the tensioner. Setting back, i.e., retraction of the plunger, can be impaired by premature closure of the check valve. Alternatively, slow flow of oil through the check valve can delay the advancing movement of the plunger and thereby delay the application of tension to the traveling transmission medium.

Accordingly, there is a need for a hydraulic tensioner that can be assembled more efficiently and at a reduced cost. There is also a need for a hydraulic tensioner in which the circumferential positioning of the check valve unit is independent of the attitude of the tensioner so that the passage or passages leading from the valve chamber of the check valve to the oil chamber of the tensioner are automatically positioned optimally for suppression of disorderly movement of the check ball. There is a further need for a hydraulic tensioner in which the application of tension is quick and stable, in which movement of the plunger in the setback direction is well-controlled.

SUMMARY OF THE INVENTION

The hydraulic tensioner in accordance with the invention comprises a tensioner housing attached to a machine that includes an endless, flexible, power transmission medium in driven and driving engagement respectively with a driving rotating member and a driven rotating member. A plunger-accommodating hole is formed in the housing, and a plunger protrudes from the plunger-accommodating hole, for maintaining tension in the flexible power transmission medium. The plunger and housing form an expansible hydraulic chamber, and the plunger is reciprocably movable in the plunger-accommodating hole so that it can move alternatively in an advancing direction in which the volume of the hydraulic chamber increases and in a setback direction in which the volume of the hydraulic chamber decreases.

An oil supply passage is formed in the housing for flow of oil into the hydraulic chamber, and a check valve unit is arranged to permit oil to flow through the oil supply passage into the hydraulic chamber as the plunger moves in its advancing direction while applying tension to the flexible power transmission medium, and to restrict the flow of oil out from said hydraulic chamber through the oil supply passage when a reaction force from the flexible power transmission medium urges the plunger in the setback direction.

The check valve unit comprises a ball seat having a seating surface and a valve oil passage, extending through the ball seat from the seating surface, for oil communication between the oil supply passage and the hydraulic chamber. A check ball is provided for seating on the seating surface and thereby closing the valve oil passage. The check ball is separable from the seating surface to open the valve oil passage.

A retainer limits the distance by which the check ball can separate from the seating surface. The retainer and the ball seat cooperatively form a wall of a valve chamber in which the check ball is accommodated. The oil supply passage communicates with the hydraulic chamber through the valve oil passage and the valve chamber.

The retainer and the ball seat are parts of a unitary element.

As in a conventional hydraulic tensioner, the check valve unit makes it possible to apply tension to the chain quickly by allowing oil to flow into the hydraulic chamber from the oil supply passage, and to prevent the tension in the chain from dropping excessively by confining the oil in the hydraulic chamber and thereby preventing the plunger from moving in the setback direction.

In addition, because the retainer and the ball seat are a unitary element, it becomes easier to insert the check ball and thereafter close the retainer onto the ball seat. Accordingly, manufacture of the check valve unit can be carried out more efficiently and at reduced cost.

According to a second aspect of the invention, the unitary element includes a connecting portion that connects the ball seat with the retainer. This connecting portion is in the form of a bend in a material forming the unitary element.

It is possible to form the check valve unit easily by bending the connecting portion while the check ball is held in the cylindrical portion, i.e., in the valve chamber. Accordingly, it is possible to realize further improvements in manufacturing efficiency.

According to a third aspect of the invention, in which the connecting portion is in the form of a bend in the unitary element, the tensioner is rotatably supported in the housing for rotation about a center line. The center of gravity of the unitary element is offset from the center line, and the unitary element is rotatable about the center line to a position in which its center of gravity is vertically below the center line. The bend is positioned on the side of the center line opposite from the center of gravity, and is formed with a bend line that intersects an imaginary vertical center plane in which the center line lies when the center of gravity is vertically below said center line. The center of gravity of the unitary element is offset from the center line by a distance sufficient to produce a gravitational moment tending to rotate the unitary element about said center line. This gravitational moment has a magnitude that exceeds the minimum frictional moment caused by friction between the unitary element and the tensioner housing.

With this arrangement, the check valve unit automatically assumes a proper position, in which the center of gravity of the retainer/seat combination approaches a position directly underneath the center line. Therefore, it is unnecessary to take the position of the check valve unit into account when determining the position in which the tensioner is attached to an engine or other machine. Accordingly, it becomes easier to assemble the check valve unit in the housing, and further improvements in manufacturing efficiency and cost reduction can be realized.

It is possible to define the position of the center of gravity of the retainer/seat combination by utilizing the bend that connects the retainer with the ball seat. The bend is located above the center line when the retainer/seat combination rotates due to a gravitational moment and intersects an imaginary vertical central plane when the check valve unit assumes its proper position. The bend also allows the size and weight of the retainer/seat combination to be reduced.

The position of the center of gravity can be adjusted by adjusting the radial position of the bend with respect to the center line when forming the bend.

The bend can also be utilized as an indicator that the check valve unit is in its proper rotational position when the check valve unit is inserted into the tensioner housing, thereby obviating a dedicated indicator.

According to still another aspect of the invention, the tensioner further comprises a plurality of communicating holes in the wall of the valve chamber. These holes provide fluid communication between the valve chamber and the hydraulic chamber. The housing is attached to the machine in an attitude such that said center line extends in a direction in a range from a horizontal direction to an oblique direction wherein the movement of the check ball away from the ball seat is obliquely upward. All of the communicating holes are located above an imaginary plane that is below and parallel to the center line, tangent to the check ball when the check ball is seated, and orthogonal to an imaginary vertical center plane that contains the center line.

With this arrangement, oil located below the tangential plane within the valve chamber is prevented from flowing to the hydraulic chamber through the communicating holes, so that, when the check ball, which tends to be displaced downward due to its own weight, is separated from the ball seat, an oil film is maintained between the check ball and the part of the valve chamber wall below the check ball. The oil film suppresses downward displacement of the check ball, so that retardation of valve closure is reduced. Accordingly, it is possible to improve suppression of setting back of the plunger, and also to suppress disorderly movement of the check ball caused by flow of oil within the valve chamber.

If a plurality of communicating holes is provided, the influence of the flow of oil within the valve chamber on the behavior of the check ball is reduced, and the flow of oil from the oil supply passage, through the valve oil passage, and into the hydraulic chamber can be stabilized. The oil film formed between the check ball and the valve chamber wall also suppresses downward displacement of the check ball, so that it is possible to prevent the check ball from partially blocking the communicating holes. Accordingly, it is possible to suppress variations in the rate of flow of oil into the hydraulic chamber from the oil supplying passage, and to improve the rapidity and stability with which the plunger applies tension to the transmission medium.

According to a still another aspect of the invention, areas of the ball seat and retainer that can be contacted by the check ball are work hardened. The work-hardened area of the retainer is within a projection along the center line of the check ball, when seated. The work-hardened area of the ball seat is limited to the seating surface in the ball seat.

With this arrangement, the oil film formed between the check ball and the part of the valve chamber wall below the check ball when the check valve is open suppresses collision of check ball against the valve chamber wall. Only limited areas need to be treated. Accordingly, it is unnecessary to carrying out hardening of the entire retainer or the entire ball seat, and the cost of the check valve unit can be reduced while the durability of the retainer/seat combination is improved.

Because abrasion resistance of the seating surface is improved by work hardening, it is possible to maintain an oil tight relationship between the check ball and the seating surface over a long time.

According to still another of the invention, the hydraulic tensioner further comprises a compression spring disposed between the plunger and the retainer. The compression spring urges the plunger in its advancing direction and exerts a force on the retainer that presses the check valve unit in its setback direction. The force exerted by the compressing spring on the retainer, and pressure exerted by oil in the hydraulic chamber, are the only substantial forces that prevent the check valve unit from moving in the advancing direction relative to the tensioner housing.

With this arrangement, it becomes easy to assemble and install the check valve unit, and to improve the overall efficiency of the manufacture of the tensioner. The force exerted by the compression spring against the retainer also prevents the retainer from opening by separating from the ball seat as a result of collision of the check ball against the retainer.

DETAILED DESCRIPTION OF THE PREFERRED EMBODIMENTS

Figure 1:
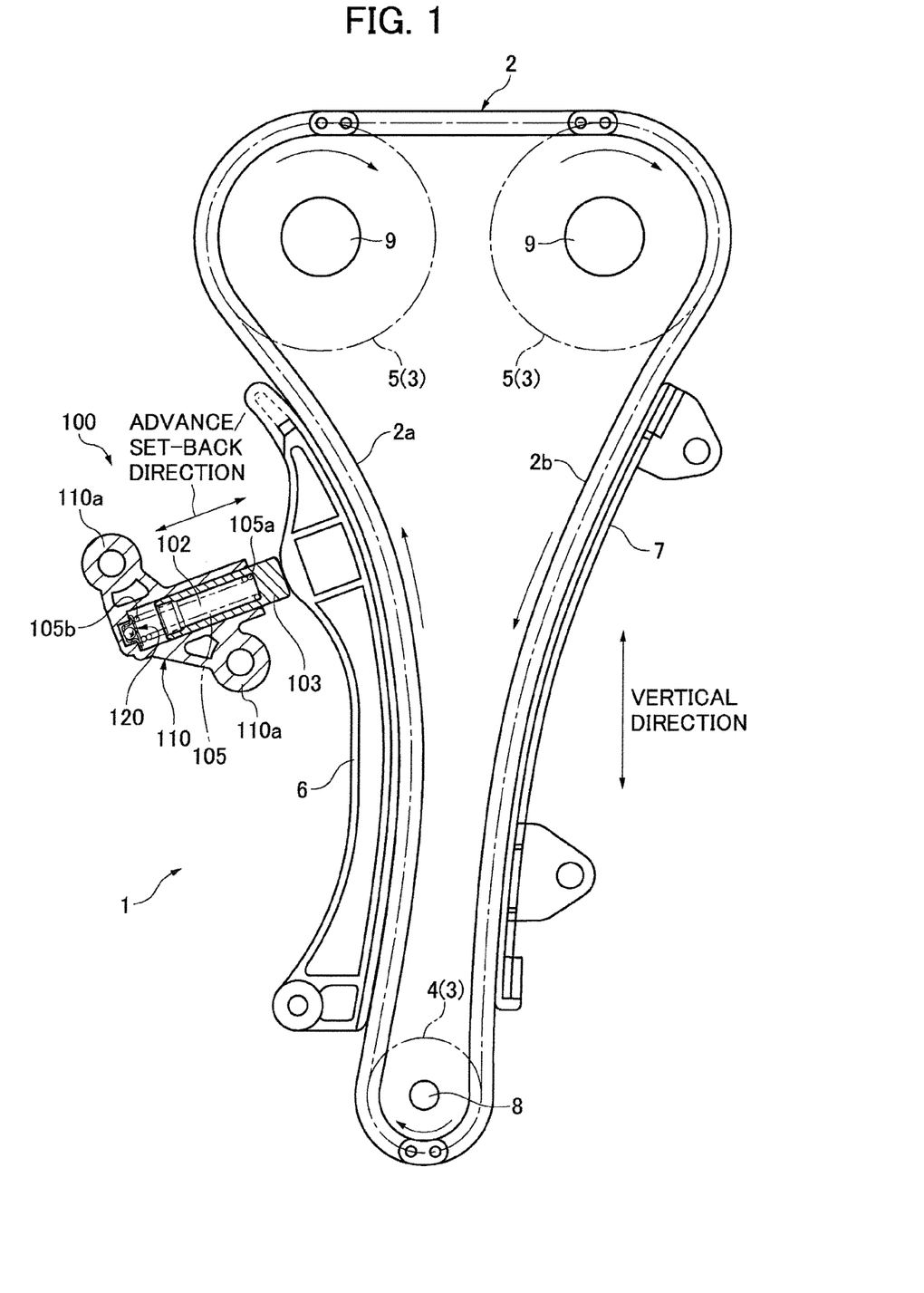
FIG. 1 is a schematic front elevational view of a chain transmission including a hydraulic tensioner in accordance with the invention, in which the tensioner is shown in cross-section taken on section plane I-I in FIG. 3.

As shown in FIG. 1, the hydraulic tensioner 100 is provided in a chain transmission 1. In the particular embodiment shown, the chain transmission is the timing drive of a dual overhead cam (DOHC) automobile engine.

An endless flexible transmission medium, in this case, a chain 2, is in driving or driven engagement with a plurality of rotating members 3, and in this case, in driven engagement with a crankshaft sprocket 4 on an engine crankshaft 8, and in driving engagement with a pair of camshaft sprockets 5 on engine camshafts 9. The slack side of the chain 2, i.e., the span 2a, that travels from crankshaft sprocket 4 toward one of the camshaft sprockets 5, is in sliding engagement with a movable guide 6, which is pivotably mounted on the engine. The tension side of the chain, i.e., span 2b, that travels from one of the camshaft sprockets 5 toward the crankshaft sprocket 4, is in sliding engagement with a stationary guide 7, which is also attached to the engine.

The housing 110 of the tensioner 100 is provided with flanges 110a for attachment to the engine at a location such that the tensioner can exert a force against the pivoted guide 6, urging the pivoted guide against the slack side of the chain.

A plunger 103 protrudes from a plunger-accommodating hole 111 (FIG. 2) formed in the housing 110, and is reciprocably movable in the plunger-accommodating hole. The plunger and the plunger accommodating hole form a hydraulic chamber 102, and the plunger is movable alternatively in an advancing direction in which the volume of the hydraulic chamber increases, and in a setback direction in which the volume of the hydraulic chamber decreases. When the plunger 103 moves in the advancing direction, it presses the pivoted guide 6 against the chain, increasing tension in the chain 2. The plunger 103 may be arranged so as apply tension to the chain through an intermediate member other than a pivoted guide. For example, a chain guide directly mounted on the plunger can be utilized.

Figure 2:
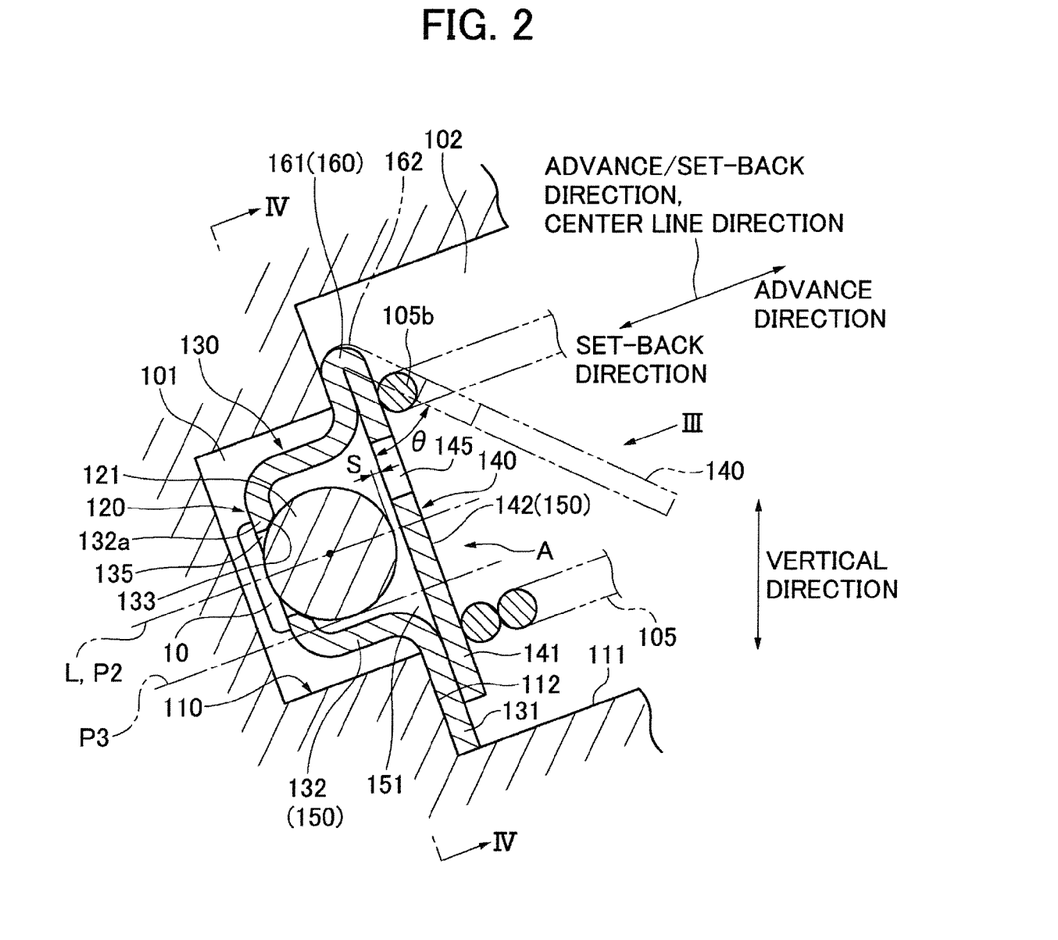
FIG. 2 is an enlarged sectional view showing a part of the hydraulic tensioner of FIG. 1, including its check valve unit.

As shown in FIG. 2, the housing 110 is formed with an oil supply passage 101, through which oil is supplied from another oil passage 10 in the engine block. The oil is supplied under pressure, typically from the engine oil pump.

As shown in FIGS. 1 and 2, a coiled compression spring 105 is disposed within the hydraulic chamber 102 to urge the plunger 103 in the advancing direction. A check valve unit 120 permits oil to flow from the oil supply passage 101 into the hydraulic chamber 102, but while restricts the flow of oil in the opposite direction, i.e., from the hydraulic chamber 102 to the oil supply passage 101.

The compression spring 105 and the oil in the hydraulic chamber 102 cooperatively urge the plunger in the advancing direction.

As shown in FIG. 2, the check valve unit 120 is removably mounted within housing, being disposed in part in hydraulic chamber 102, and in part in oil supply passage 101. The check valve unit includes a ball seat 130 provided with a valve oil passage 135, through which oil can flow from oil supply passage 101 into a valve chamber 151 within the check valve unit. A check ball 121, disposed within the valve chamber 151 is arranged to open and close the valve oil passage 135 by separating from, and seating on, an annular seating surface 133 of the ball seat 130 surrounding the oil passage 135. A plate-shaped retainer defines and limits the stroke distance S of the check ball 121, i.e. the distance through which the check ball can move away from its seated condition. The stroke distance S is measured along, or parallel to, a center line L, which is the axis of the annular seating surface 133. When the check valve is closed, i.e., when the check ball 121 is seated on surface 133, the center line L extends substantially through the center of the check ball 121. In the check valve unit shown, center line L also substantially coincides with the axis of the valve oil passage 135, and with the axis of the plunger-accommodating hole.

In the timing chain transmission of FIG. 1, the tensioner 100 is attached to the engine at an attitude such that the center line L extends in an oblique direction so that, as the plunger moves in the advancing direction, it moves obliquely upward, and so that, as the check valve opens, the check ball also moves obliquely upward.

In the description that follows, the term "center line direction" refers to any direction along, or parallel to, center line L. The term "circumferential direction" refers to a direction along an imaginary circle whose center is on center line L and all of whose parts are in an imaginary plane to which the center line is parallel. The term "radial direction" refers to a direction intersecting the center line perpendicularly. The term "substantially" is intended to encompass a range of minor variations in which there is no significant difference in operation and effect.

Figure 5:
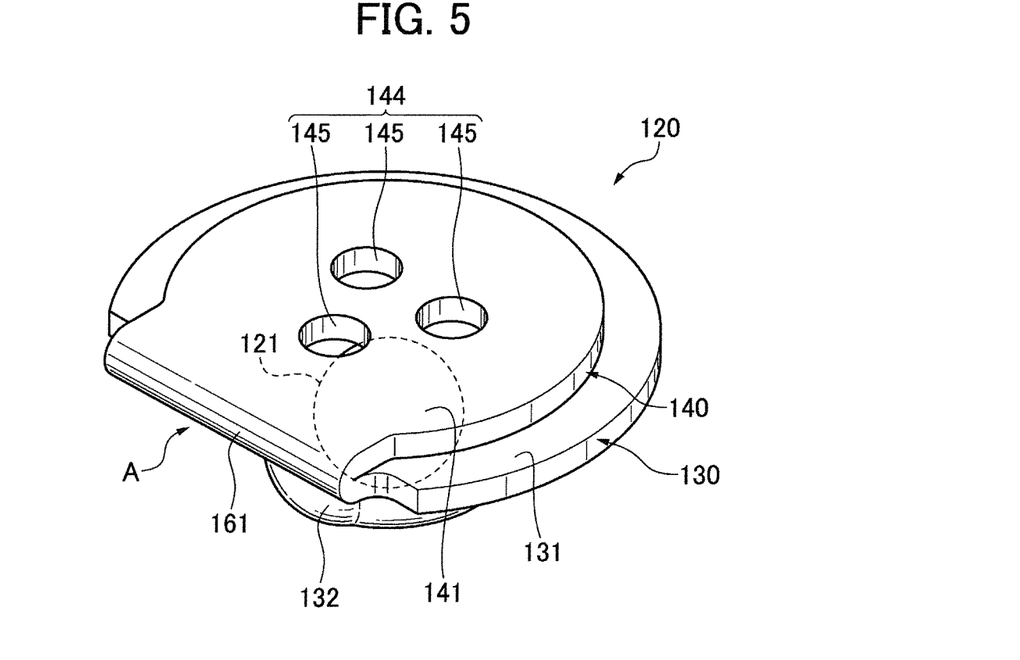
FIG. 5 is a perspective view of the check valve unit.

As shown in FIG. 2, the retainer 140 and the ball seat 130 form a valve chamber wall 150 defining the valve chamber 151 in which the check ball 121 is accommodated. A connecting oil passage 144 (FIG. 5), which may be composed of a plurality of individual holes 145, is provided in the retainer 140 to connects the valve chamber 151 with the hydraulic chamber 102 of the tensioner. Thus, the oil supply passage 101 and the hydraulic chamber 102 communicate with each other through the valve oil passage 135, the valve chamber 151 and the connecting oil passage 144.

The check ball 121 separates from the seating surface 133 when hydraulic pressure within the hydraulic chamber 102 becomes lower than the hydraulic pressure in the valve oil passage 135, for example, advancing movement of the plunger 103 as it reestablishes tension in span 2a of the chain. As the check ball 121 separates form the seating surface 133, the check valve opens and oil can flow from the oil supply passage 101 into the hydraulic chamber 102.

When the oil pressure in the hydraulic chamber 102 exceeds the pressure of the oil in the valve oil passage 135, for example, as a result of a force in the setback direction exerted by the chain 2 on the plunger 103 through the pivoted guide 6, the check ball 121 will seat on the seating surface 133, blocking reverse flow of oil. That is, when the check ball is seated, the check valve is closed, and oil is prevented from flowing outward from the hydraulic chamber 102 to the valve oil passage 135. No valve spring or other device is required in the check valve unit 120 to urge the check ball 121 in a valve-closing direction.

As shown in FIGS. 2 through 5, the ball seat 130 and the retainer 140 are formed as a unitary element, i.e., not made by joining separate parts. In the embodiment described, the retainer and seat, designated by the letter A, are formed from a metal plate having a substantially uniform thickness. The seating part of the metal plate is formed using a punch and die or other suitable means. The check ball is then inserted into the seating part, and a portion 160 that connects the seating part to the retainer is bent by forming a 180° bend 161 so that the valve chamber 151 is formed.

Figure 3:
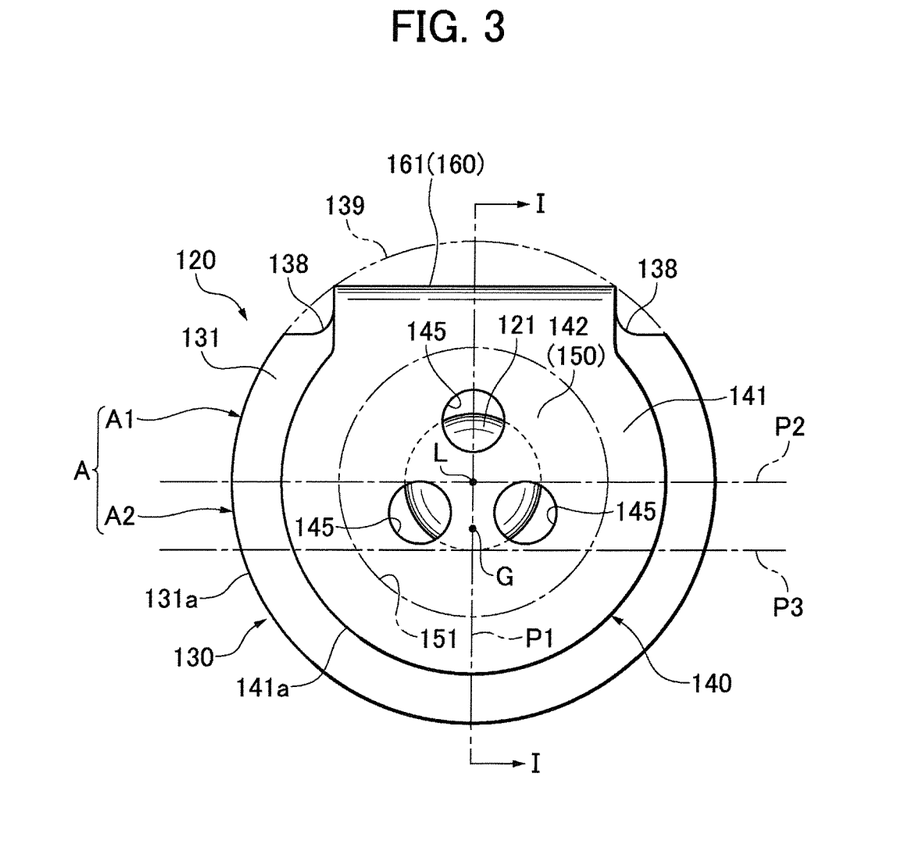
FIG. 3 is an elevational view of the check valve unit as seen in the direction of arrow III in FIG. 2.
Figure 4:
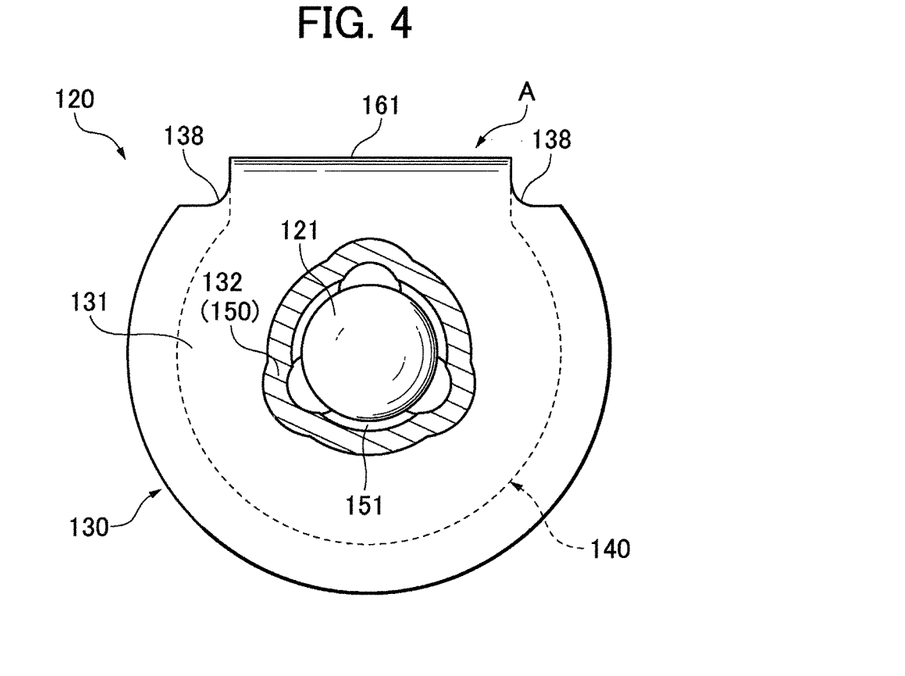
FIG. 4 is a cross-sectional view of the check valve unit taken on section plane IV-IV in FIG. 2.

As shown in FIG. 2, the ball seat 130 has a plate-like flange 131, and a cylindrical portion 132 that extends from the flange 131 in the direction of center line L. The flange 131 is used to position the check valve unit 120 in the housing 110. As shown in FIG. 3, the flange has an arc-shaped outer peripheral edge 131a that is positioned radially outward from an arc-shaped outer peripheral edge 141a of the retainer 140. The seating surface 133 is formed on a seat portion 132 at the end of the cylindrical portion 132 farthest from the flange 131.

As shown in FIG. 2, the ball seat 130 is mounted so that its flange 131 is in surface contact with an annular surface 112 formed at the bottom of the plunger-accommodating hole, and surrounding the oil supply passage, which receives the ball seat 130. The check valve unit 120, is supported in the housing 110 in such a way that it can rotate about the center line L. The outer circumferential edge 131a of the flange 131 (FIG. 3) has a radius of curvature that is substantially the same as that of the portion of the plunger-accommodating hole adjacent annular surface 112. Consequently, the axis of rotation of the check valve unit 120 substantially coincides with center line L, and rotation of the check valve unit within the tensioner is stable.

The cylindrical portion 132 of the check valve unit accommodates at least a part of the check ball 121. In the embodiment shown, the entire check ball 121 is accommodated within the cylindrical portion of the check valve unit.

The plate-shaped retainer 140 faces the flange 131, and has its outer circumferential portion 141 in contact with the flange. A central part of the retainer serves as a part 142 of the valve chamber wall 150, the other part being composed of the cylindrical portion 132 of the check valve unit.

The holes 145, that provide communication between the valve chamber 151 and the hydraulic chamber 102, are formed in part 142 of the valve chamber wall, and not in the outer circumferential portion 141, which is in contact with the flange 131.

The check valve unit is not restricted from displacement away from annular surface 112 except by compression spring 105, an end of which is in engagement with retainer 140.

The bend 161 is formed such that the flange 131 of the ball seat 130 is continuous with the outer circumferential portion 141 of the retainer 140, being connected to the outer circumferential portion 141 by bend 161. Since the bend 161 is the only connection between the flange 131 and the outer circumferential portion 141 of the retainer, except for the formation of the cylindrical part 130, only one bending operation is required in the formation of the check valve unit 120, and its manufacture is simplified. Moreover, because the retainer and the flanged cylindrical part are connected only by bend 161, the check valve unit can be opened easily for maintenance.

Although the bend 161 is a single straight bend in the embodiment shown, in alternative embodiments, the retainer can be connected to the flange by a bend composed of plural separate parts. Here as in the embodiment shown, the bend can be formed by a single bending operation.

The bend 161, which is orthogonal to a central plane P1 (FIG. 3) allows the retainer 140 to be inclined relative to the ball seat to the oblique condition indicated by a broken line in FIG. 2. By bending the retainer through an angle θ (FIG. 2), the check ball 121 can be inserted into, or taken out of, the check valve unit. Accordingly, the check ball can be easily installed in, or removed from, the check valve unit 120, and assembly and maintenance of the check valve unit 120 are simplified.

As shown in FIG. 3, no part of the bend 161 extends radially from center line L beyond an imaginary extension 139 of the circular arc forming the circumferential edge 131a of the flange 131, and is located radially inside of an imaginary outer circumferential edge 139 centering on the center line L (see FIG. 3). The position of the center of gravity (G) of the combined seat and retainer of the check valve unit depends on the distance of the bend 161 from the center line L.

Notches 138 are provided in the ball seat 130, the retainer 140, or both, in the embodiment shown. i.e., the ball seat 130 in the present embodiment. The notches reduce the weight of the retainer/seat combination, and also affect the position of the center of gravity G.

As shown in FIG. 1, the coiled compression spring 105 extends into a hollow part of the plunger 103, which forms a part of the hydraulic chamber 102. The spring is disposed in part within the hollow part of the plunger 103. One end 105a of the spring bears against the forward end of the hollow part of the plunger, and the other end 105b bears against the retainer 141, as shown both in FIG. 1 and in FIG. 2.

The compression spring 105 presses against the retainer 14, causing flange 131, to press against annular surface 112 of the housing 110.

As shown in FIG. 3, retainer/seat combination A consists of two parts A1 and A2, part A1 including the bend 161. These parts A1 and A2 are respectively above and below a plane P2 that contains the center line L and is orthogonal to the vertical center plane P1. Part A1 is lighter in weight than part A2. As a result, the center of gravity G of the retainer/seat combination A is located on the vertical center plane P1 but below the center line L. The bend 161 is located above the center line L, intersecting the vertical center plane P1 in an orthogonal direction.

Because the center of gravity G of the retainer/seat combination A, is below the center line L, the check valve unit rotates in the circumferential direction about the center line L so that the center of gravity G approaches the vertical center plane P1. This rotation occurs when the gravitational moment acting on the check valve unit 120 surpasses the frictional moment caused by a frictional force between the retainer-seat part A and the housing 110. This frictional force includes a resistance due to the viscosity of the oil present in the hydraulic chamber 102 of the tensioner.

Because the check valve unit is allowed to rotate in the housing about the center line L, and its center of gravity is spaced radially from the center line, the check valve unit positions itself automatically, rotating until the center of gravity G is approximately in vertical plane P1 and approximately directly below the center line L. Accordingly, the holes 145 reach specific positions relative to the vertical and horizontal planes P1 and P2. It is through these holes that oil flows through the check valve into the hydraulic chamber, and it is also through these holes that any air present in the oil is bled from the valve chamber.

All of the holes 145, i.e., the entire connecting oil passage 144 (FIG. 5), are located above a plane P3 (FIGS. 2 and 3) that is in tangent to the check ball 121 when the check ball is in a closed condition against the valve seat. The tangential plane P3 is parallel to, and below, the center line L below the center line L, and orthogonal to the vertical center plane P1 that contains the center line L.

Because the communicating holes 145 are above plane P3, they are not underneath the check ball 121 either when the check valve is in its open condition when the check valve is in its closed condition.

Rotation of the check valve unit 120 can occur when the frictional force and the frictional moment are reduced. Such reduction can occur due to any of several to phenomena, for example small amplitude vibration of plunger 103 in the direction of center line L due to variation in chain tension that occur with changes in engine operating conditions. When vibration of the plunger occurs, the force exerted by the compression spring 105 on the retainer/seat combination A fluctuates, and can drop sufficiently to allow rotation of the check valve unit. A similar reduction in the force exerted by the compression spring can occur when the plunger is out of contact with the pivoted guide during attachment of the tensioner to the engine block. A reduction in friction that allows rotation of the check valve unit can also occur due to impact of the check ball 121 against the retainer 140 due to variation in the hydraulic pressure within the hydraulic chamber 102.

When the check ball 121 is seated, i.e., the check valve is in the closed condition, the interface between the flange 131 and surface 112 maintained substantially oil-tight by the force exerted by the compression spring 105.

In the fabrication of the check valve unit 120, a unitary plate-like element is formed from a plate by operations such as punching and spinning. This unitary plate-like element consists of the retainer 140 and the ball seat 130, which are continuous with each other and connected by a connecting portion 160 before the connecting portion is bent to form bend 161.

The communicating holes 145 and the valve oil passage 135 can be formed by drilling. The seat surface 133 is formed by grinding a peripheral portion of the valve oil passage 135 in cylindrical portion 132.

Areas of the plate-like element that will be in contact with the check ball 121 are work-hardened. These areas include a contact area of the retainer within the projection of the check ball 121 along the direction of the center line L, as seen in FIG. 3, when the check ball is in its valve-closing condition, and the seating surface 133 in the ball seat 130. The contact area of the retainer contact can be determined by experiment and simulation.

The connecting portion 160 of the plate-like element is bent to an intermediate condition in which the connecting portion has a bend 162 as indicated by a broken line in FIG. 2. When the connecting portion is bent to this intermediate condition, the retainer 140 is open sufficiently to allow the check ball 121 to be inserted.

After insertion of the check ball 121 into the cylindrical portion 132, and while the check ball is within the cylindrical portion, the intermediate part 160 is bent further to form a bend 161 to complete the formation of the check valve unit 120.

The check valve unit 120 prevents oil from flowing out of the hydraulic chamber 102 to the oil supply passage 101 when a reaction force from the chain acts on the plunger 103 in the set-back direction. However, the check valve unit permits oil to flow into the hydraulic chamber 102 from the oil supply passage 101 when the plunger 103 applies tension to the chain. Flow of oil from the oil supply passage 101 to the chamber 102 takes place through the valve oil passage 135, the valve chamber 151 and the communicating holes 145.

The check valve unit 120 makes it possible for the plunger 103 to apply tension to the chain 2 rapidly by allowing flow of oil into the hydraulic chamber 102 from the oil supply passage 101 when the check ball 121 separates from the valve seat. However, by confining the oil in the hydraulic chamber 102 by closure of the check valve, the check valve unit also prevents the plunger 103 from setting back due to a reaction force applied to the plunger by the chain 2, and thereby prevents tension in the chain from dropping excessively.

Because the retainer 140 and the ball seat 130 form a unitary retainer/seat combination A, the positional relationship between the retainer and the ball seat is predetermined, and manufacture of the check valve unit is greatly simplified. It is easy to close the retainer 140 onto the ball seat 130 after inserting the check ball 121, because the retainer 140 and the ball seat 130 are formed as a unit. Therefore, producing the check valve unit according to the invention is less difficult than production of a check valve unit in which the retainer and the ball seat are separate parts. Accordingly, it is possible to improve manufacturing efficiency and reduce the manufacturing costs of the check valve unit and of the tensioner. Manufacture is also simplified because the check ball 121 is accommodated in the cylindrical portion 132 while the connecting part 160 is bent to form the bend 161 as the retainer 140 is moved into the position in which it closes the valve chamber 151.

The retainer/seat combination A is supported in the housing 110 so as to be rotatable about the center line L, with the center of gravity G of the retainer/seat combination A being located below the center line L, and the bent portion 161 being located above the center line and intersecting the vertical center plane P1 when the center of gravity G of the retainer-seat part A is located on the vertical center plane P1. The retainer/seat combination A rotates in the circumferential direction such that the center of gravity G approaches the vertical center plane P1 when the gravitational moment acting on the retainer/seat combination surpasses the moment caused by friction between the retainer/seat combination A and the housing 110. With this arrangement, rotational positioning of the check valve unit 120 takes place automatically so that the center of gravity G approaches the vertical center plane P1. Therefore, it is unnecessary to take the angle of attachment of the tensioner 100 to the engine into account when installing the check valve unit in the tensioner.

In the tensioner, the bend 161 determines the position of the center of gravity G because the weight of the retainer/seat combination in the vicinity of the bend 161 is less than the weight of the retainer/seat portion at locations remote from the bend, but at the same radial distance as the bend from the center line L. The reduced weight in the vicinity of the bend 161 also reduces the overall weight of the check valve unit.

The position of the center of gravity G can also be adjusted by adjusting the radial position of the bend 161 with respect to the center line L when forming the bend.

The bend 161 can also be utilized to indicate when the check valve unit 120 is in its proper position with its center of gravity G directly below the center line L. Thus the circumferential position of the check valve unit 120 with respect to the housing 110 can be roughly determined in assembly of the tensioner without the need for a dedicated indicator.

The tensioner housing 110 is attached to the engine in such a way that the center line L extends either horizontally or obliquely upward, proceeding in the direction of advancing movement of the plunger (i.e., in the direction of movement of the check ball 121 away from its seat. When the check valve unit is in its proper circumferential position in the tensioner housing, all of the communicating holes 145 are located above the tangential plane P3. When the check valve unit is properly positioned, oil within the valve chamber 151, but below the tangential plane P3, is prevented from flowing through holes 145 from the valve chamber to the hydraulic chamber 102, and an oil film is maintained between the check ball 121 and the wall 150 of the cylindrical part of the seat when the check ball is away from its seat. Even though the check ball tends to be displaced downward due to its own weight, the oil film suppresses the downward displacement of the check ball 121, so that retardation of closing movement of the check ball 121 is reduced. Accordingly, it is possible to improve suppression of the setting back movement of the plunger 103, and also to suppress disorderly movement of the check ball 121 caused by flow conditions in the oil within the valve chamber 151.

If a plurality of communicating holes 145 is provided, the influence of oil flow on the behavior of the check ball 121 within the valve chamber 151 can be reduced, and the rate and volume of flow of oil into the hydraulic chamber 102 from the oil supply passage 101 through the valve oil passage 135, the valve chamber 151 and the respective communicating holes 145 can be stabilized.

The positions of the oil communication holes 145 is such that the check ball 121 is prevented from blocking or partially blocking the holes 145. Consequently, it is possible to suppress variation of the amount of the oil flowing into the hydraulic chamber 102 from the oil supply passage 101, and to improve rapidity and stability of the application of tension to the chain by the plunger 103.

The areas of the seat/retainer combination that come into contact with the check ball 121 can be subjected to upsetting. These areas are an area of the retainer within the projection of the check ball 121 when seated in the direction along the center line L, and the seating surface 133 in the ball seat 130.

The oil film formed between the check ball 121 and the valve chamber wall 150 below the check ball 121 when the check ball is unseated suppresses collision of the check ball 121 with wall 150. Consequently the areas on which the upsetting or other hardening process is carried out need not extend beyond the projection of the check ball or beyond the seating surface 133. Accordingly, the durability of the retainer/seat combination can be improved without treating the entire retainer or the entire ball seat, and it is possible to reduce the cost of the check valve unit 120 while improving the durability of the retainer/seat combination A.

Work hardening of the seating surface 133 improves the abrasion resistance of the seating surface, and enables the check ball to maintain an oil-tight relationship with the seat over a long interval of time.

There is no special element that maintains the retainer 140 in fixed relationship to the seat. The retainer is held against the flange of the seat by the bend 161 and by the force exerted by the compression spring. Accordingly, assembly of the check valve unit 120 and of the tensioner can be carried out efficiently and at low cost. The force exerted by the compression spring also resists opening of the retainer as a result of collision between the check ball and the retainer.

Various modifications to the configuration of the embodiment described above can be made. For example, the ball seat can be substantially planar as a whole, while the retainer 140 can be formed with a cylindrical portion, projecting into the hydraulic chamber, for accommodating all or part of the check ball. Alternatively both the retainer 140 and the ball seat may have cylindrical portions that protrude respectively in opposite directions along the center line and cooperate to form the valve chamber.

The tensioner may be attached to the engine block in an attitude in which the center line L is substantially horizontal.

The outer circumferential edge 131a of the flange 131 may be smaller than the outer circumferential portion 141 of the retainer 140.

Instead of bend 161, at least one of the flange 131 and the outer circumferential portion 141 of the retainer may have one or more bent claws enabling the flange 131 to be placed into contact with the outer circumferential portion 141 of the retainer.

Although in the invention, the seat and retainer are preferably unitary, gravitational moment can be used to determine the rotational position of a check valve unit in which the seat and retainer are formed as separate members and are integrated with each other.

The hydraulic tensioner of the invention can be used not only in an automobile engine, but also in engines for non-vehicular use, and in other kinds of machinery.

The tensioner may also be used with flexible transmission media other than chains, for example flexible transmission belts.

What is claimed is:

1. A hydraulic tensioner comprising:
   a tensioner housing attached to a machine that includes an endless, flexible power transmission medium in driven and driving engagement respectively with a driving rotating member and a driven rotating member, said housing having a plunger-accommodating hole formed therein;
   a plunger protruding from said plunger-accommodating hole, for maintaining tension in said flexible power transmission medium, the plunger and said housing forming an expansible hydraulic chamber, and the plunger being reciprocably movable in said plunger-accommodating hole whereby the plunger is movable alternatively in an advancing direction in which the volume of said hydraulic chamber increases and in a setback direction in which the volume of said hydraulic chamber decreases;
   an oil supply passage formed in said housing for flow of oil into said hydraulic chamber; and
   a check valve unit arranged to permit oil to flow through said oil supply passage into said hydraulic chamber as said plunger moves in its advancing direction while applying tension to the flexible power transmission medium, and for restricting the flow of oil out from said hydraulic chamber through the oil supply passage when a reaction force from the flexible power transmission medium urges the plunger in the setback direction;
   wherein the check valve unit comprises:
      a ball seat having a seating surface and a valve oil passage, extending through the ball seat from said seating surface, for oil communication between said oil supply passage and said hydraulic chamber;
      a check ball for seating on said seating surface and thereby closing said valve oil passage, and separable from said seating surface to open said valve oil passage; and
      a retainer that limits the distance by which the check ball can separate from said seating surface; and
   wherein:
      the retainer and the ball seat cooperatively form a wall of a valve chamber in which the check ball is accommodated;
      the oil supply passage communicates with the hydraulic chamber through the valve oil passage and the valve chamber;
      the retainer and the ball seat are parts of a unitary element;
      said unitary element includes a connecting portion that connects the ball seat with the retainer;
      the connecting portion is in the form of a bend in a material forming said unitary element;
      said unitary element is rotatably supported in the housing for rotation about a center line;
      said unitary element has a center of gravity;
      said unitary element is rotatable about said center line to a position in which its center of gravity is vertically below said center line;
      said bend is positioned on the side of said center line opposite from said center of gravity and is formed with a bend line that intersects an imaginary vertical center plane in which said center line lies when the center of gravity is vertically below said center line; and
      the center of gravity of said unitary element is offset from the center line by a distance sufficient to produce a gravitational moment causing said unitary element to rotate about said center line when said center of gravity is displaced from a position substantially vertically below said center line, said gravitational moment having a magnitude that exceeds the minimum frictional moment caused by a friction between said unitary element and the tensioner housing, whereby the unitary element is maintained at a position in which its center of gravity is substantially vertically below said center line.

2. A hydraulic tensioner comprising:

a tensioner housing attached to a machine that includes an endless, flexible power transmission medium in driven and driving engagement respectively with a driving rotating member and a driven rotating member, said housing having a plunger-accommodating hole formed therein;

a plunger protruding from said plunger-accommodating hole, for maintaining tension in said flexible power transmission medium, the plunger and said housing forming an expansible hydraulic chamber, and the plunger being reciprocably movable in said plunger-accommodating hole whereby the plunger is movable alternatively in an advancing direction in which the volume of said hydraulic chamber increases and in a setback direction in which the volume of said hydraulic chamber decreases;

an oil supply passage formed in said housing for flow of oil into said hydraulic chamber; and a check valve unit arranged to permit oil to flow through said oil supply passage into said hydraulic chamber as said plunger moves in its advancing direction while applying tension to the flexible power transmission medium, and for restricting the flow of oil out from said hydraulic chamber through the oil supply passage when a reaction force from the flexible power transmission medium urges the plunger in the setback direction;

wherein the check valve unit comprises:

a ball seat having a seating surface and a valve oil passage, extending through the ball seat from said seating surface, for oil communication between said oil supply passage and said hydraulic chamber;

a check ball for seating on said seating surface and thereby closing said valve oil passage, and separable from said seating surface to open said valve oil passage; and a retainer that limits the distance by which the check ball can separate from said seating surface; and wherein:

the retainer and the ball seat cooperatively form a wall of a valve chamber in which the check ball is accommodated;

the oil supply passage communicates with the hydraulic chamber through the valve oil passage and the valve chamber;

the retainer and the ball seat are parts of a unitary element;

said unitary element is rotatably supported in the housing for rotation about a center line;

said unitary element has a center of gravity;

said unitary element is rotatable about said center line to a position in which its center of gravity is vertically below said center line; and the center of gravity of said unitary element is offset from the center line by a distance sufficient to produce a gravitational moment causing said unitary element to rotate about said center line when said center of gravity is displaced from a position substantially vertically below said center line, said gravitational moment having a magnitude that exceeds the minimum frictional moment caused by a friction between said unitary element and the tensioner housing, whereby the unitary element is maintained at a position in which its center of gravity is substantially vertically below said center line.

3. A hydraulic tensioner comprising:

a tensioner housing attached to a machine that includes an endless, flexible power transmission medium in driven and driving engagement respectively with a driving rotating member and a driven rotating member, said housing having a plunger-accommodating hole formed therein;

a plunger protruding from said plunger-accommodating hole, for maintaining tension in said flexible power transmission medium, the plunger and said housing forming an expansible hydraulic chamber, and the plunger being reciprocably movable in said plunger-accommodating hole whereby the plunger is movable alternatively in an advancing direction in which the volume of said hydraulic chamber increases and in a setback direction in which the volume of said hydraulic chamber decreases;

an oil supply passage formed in said housing for flow of oil into said hydraulic chamber; and a check valve unit arranged to permit oil to flow through said oil supply passage into said hydraulic chamber as said plunger moves in its advancing direction while applying tension to the flexible power transmission medium, and for restricting the flow of oil out from said hydraulic chamber through the oil supply passage when a reaction force from the flexible power transmission medium urges the plunger in the setback direction;

wherein the check valve unit comprises:

a ball seat having a seating surface and a valve oil passage, extending through the ball seat from said seating surface, for oil communication between said oil supply passage and said hydraulic chamber;

a check ball for seating on said seating surface and thereby closing said valve oil passage, and separable from said seating surface to open said valve oil passage; and a retainer that limits the distance by which the check ball can separate from said seating surface; and wherein:

the retainer and the ball seat cooperatively form a wall of a valve chamber in which the check ball is accommodated;

the oil supply passage communicates with the hydraulic chamber through the valve oil passage and the valve chamber;

the retainer and the ball seat are parts of a unitary element;

said unitary element includes a connecting portion that connects the ball seat with the retainer;

the connecting portion is in the form of a bend in a material forming said unitary element;

said unitary element is rotatably supported in the housing for rotation about a center line;

said unitary element has a center of gravity;

said unitary element is rotatable about said center line to a position in which its center of gravity is vertically below said center line; and the center of gravity of said unitary element is offset from the center line by a distance sufficient to produce a gravitational moment causing said unitary element to rotate about said center line when said center of gravity is displaced from a position substantially vertically below said center line, said gravitational moment having a magnitude that exceeds the minimum frictional moment caused by a friction between said unitary element and the tensioner housing, whereby the unitary element is maintained at a position in which its center of gravity is substantially vertically below said center line.

4. The hydraulic tensioner according to claim 3, wherein:
areas of the ball seat and retainer that can be contacted by the check ball are work hardened; and said area of the retainer is within a projection along said center line of the check ball, when seated, and said area of the ball seat is limited to the seating surface in the ball seat.

\* \* \* \* \*